May 5, 1959 R. LEHNI ET AL 2,885,166

SUSPENSION DEVICE FOR DISPLAY FRAMES

Filed Feb. 3, 1954 2 Sheets-Sheet 1

INVENTOR:
Rudolf Lehni
Fritz Keller

May 5, 1959 R. LEHNI ET AL 2,885,166
SUSPENSION DEVICE FOR DISPLAY FRAMES
Filed Feb. 3, 1954 2 Sheets-Sheet 2

INVENTOR:
Rudolf Lehni
Fritz Keller

2,885,166
SUSPENSION DEVICE FOR DISPLAY FRAMES

Rudolf Lehni and Fritz Keller, Zurich, Switzerland

Application February 3, 1954, Serial No. 407,976

Claims priority, application Switzerland May 27, 1953

2 Claims. (Cl. 248—29)

The present invention relates to suspension devices for display frames, picture frames and the like, where the article to be suspended is arranged between a back plate and a transparent cover plate.

It is an object of the invention to provide a suspension device of the type which easily permits of changing the article to be displayed in the frame and by means of which the back plate, the transparent cover plate and the display frame may be held together and suspended as a unit in a simple manner.

According to the invention, the suspension device comprises a plurality of clamps of resilient material, having perpendicular shanks, the free end of the first shank being provided with a hook like portion serving to engage the rim of the cover plate and the free end of the second shank being fitted with a hook provided for engagement of grooves in the back plate, one of the shanks having a holding loop pivotably arranged.

The present invention will now be described with reference to the accompanying drawings illustrating, by way of examples, two preferred embodiments of the invention, and in which.

Figure 2:
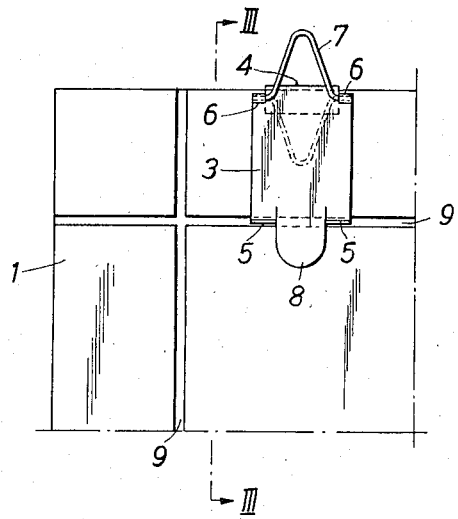
Fig. 2 shows a corner of the frame, viewed from the back.

Referring to the drawings, 1 is the back plate made of stiff material, such as pavatex, which plate serves as flat support for the picture or the like to be placed on it. A cover plate 2 made of glass or any other transparent material serves to protect the picture against dust and damage and at the same time to uniformly press the picture towards the flat support 1.

Back plate, picture and cover plate are held together on four points of their circumference by clamps 3. Each clamp 3 consists of elastic sheet metal having the shape of a rectangular disk, the one edge of which is bent around to form a hook 4 having an end portion 4a, while the opposite edge is provided with two beads 5. On both sides of the hook 4, each marginal portion of the sheet metal is bent around to form a loop 6 for pivotally securing therein a holding eye 7. The sheet metal of the clamp forms a tongue 8 at a place situated between the two beads 5.

The back plate 1 is provided with four grooves 9, which extend parallel to the edges of the plate spaced apart from said edges a distance only slightly more than the distance between the beads 5 and the upper web of the clamp 4, when the latter occupies a loose, untensioned state. The grooves are of rectangular cross section (Fig. 3); alternatively the outer side wall of the grooves may be somewhat undercut.

Figure 3:
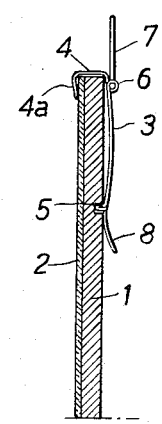
Fig. 3 is a section along the line 3—3 in Fig. 2.
Figure 1:
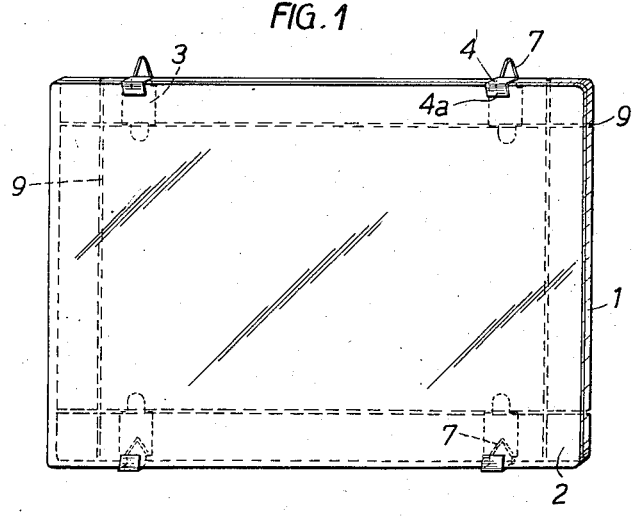
Fig. 1 is a perspective front view of the suspension device for a picture frame.

According to Figs. 1 and 3, one, two or more clamps depending on the size of the plates are placed at least over the upper and lower edges of the plates in order to hold together the back plate 1, the glass plate 2 and the picture situated between these plates. Of course, it is also possible to put one or more clamps over the lateral edges of the plates.

When the clamp 3 does not occupy a position of use, then the resilient disk is slightly arched towards the outside i.e. in a direction opposite to the hook 4 and the bead 5. In order to position the clamp 3 over the edge of the plates, for instance according to Fig. 2 the hook 4 is pushed at the left hand margin of the plates over the top edge of the joined plates 1 and 2 carrying the picture sandwiched between them and by exerting slight pressure on the curved clamp disk, the latter is elastically stretched to some extent until the beads 5 snap into the corresponding groove 9. Then the clamp may be moved towards the right hand to the desired place on the plates, while the beads 5 during this movement slide in the groove 9.

Thereafter the holding loop 7 of the two upper clamps 3 in Fig. 1 is upwardly turned into a position suitable for suspending the picture, while the holding loop 7 of the two lower clamps is swung inwardly into the position shown in dotted lines (also see Fig. 2), in which position the loop, when not in use, bears flatly against the disk of the clamp.

When the clamps 3 are in position of use with their beads 5 snapped into the grooves 9, these clamps are elastically tensioned and can not be disengaged from their position without exertion of a certain force, thus securing a firm retention of the suspended object. The tongue 8 is somewhat bent towards the outside and serves to conveniently grasp the clamp with the fingers, when the latter should be disengaged.

Figure 4:
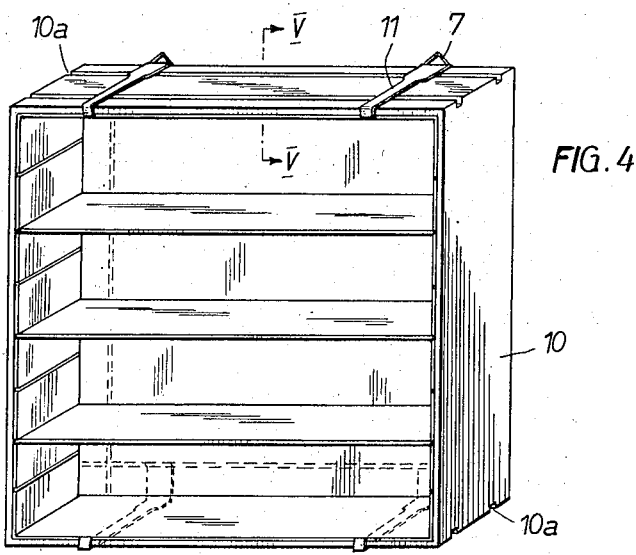
Fig. 4 is a perspective front view of the device for a show case.
Figure 5:
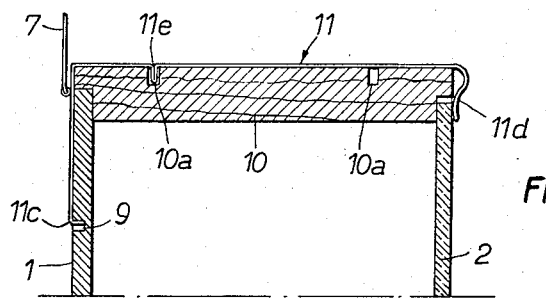
Fig. 5 is a section along line 5—5 in Fig. 4.
Figure 6:
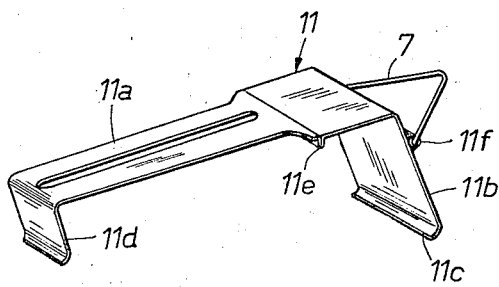
Fig. 6 is a perspective view of a clamp.

In the second embodiment, shown in Fig. 4, the article to be suspended is a show case 10, provided with horizontal shelves 12. The back wall of the show case is formed by a back plate 1, and the cover by a glass plate 2 as shown in Figs. 1–3. Back plate and cover plate are arranged in a groove of the frame of the show case, whereby the depth of the groove is such, that the plates are level with the frame (Fig. 5). The plates are held in the frame by means of clamps 11. Each one of these clamps 11 (Fig. 6) is provided with two shanks 11a and 11b arranged perpendicular to each other. The shank 11a is provided with a hook-like portion 11d at its free end serving to engage the rim of the cover plate 2. The free end of the shank 11b is fitted with a hook 11c provided for engagement of the grooves 9 in the back plate 1. In addition, the shank 11b supports a sleeve 11f in which a holding loop 7 is pivotally arranged. The shank 11a has a grooved portion 11e, engaging one of the two grooves each on the lower or upper frame part.

The device is fitted together as described above.

The described clamping device may also serve for the suspension of articles other than those described, thus for instance the plate 2 may represent a mirror.

It will be understood that various changes and modifications of the constructions herein shown and described may be made without departing from the spirit of the invention.

What we claim is:

1. For use in connecting a substantially rectangular display device to a suspension system and for mounting a transparent cover plate in superposed parallelism with a back plate thereof, the back plate having plural grooves formed inwardly of its back face and extending parallel to the outside edges thereof, an improved clamp device, comprising, a substantially rectangular disc of resilient sheet material which is normally bowed lengthwise, a hook extending substantially transversely outward of one end of said disc and adapted to embrace the edges of the cover and back plates and resiliently grip the outer face of the cover plate to clamp such two plates together, and bead means formed adjacent the other end of said disc and adapted to enter one of the grooves in the back plate, the normal distance between the said bead means and hook being slightly less than the distance between the groove and the said outside edge of the back plate whereby said disc must be resiliently deflected against the bow therein in order to engage said bead means in said groove, such deflection of the disc serving to resiliently tension the same and lock the clamp device to the display device.

2. The combination as set forth in claim 1 including means on said disc for pivotally securing a holding eye thereto, and a holding eye mounted in said means whereby the display device may be attached to a suspension system.

References Cited in the file of this patent

UNITED STATES PATENTS

| | | |
|---|---|---|
| 1,407,177 | Stone | Feb. 21, 1922 |
| 2,093,734 | Place | Sept. 21, 1937 |
| 2,109,330 | Compton | Feb. 22, 1938 |
| 2,403,491 | Bogia | July 9, 1946 |
| 2,514,047 | Goforth | July 4, 1950 |
| 2,666,364 | Kelly | Jan. 19, 1954 |

FOREIGN PATENTS

| | | |
|---|---|---|
| 191,808 | Switzerland | Sept. 1, 1937 |
| 392,719 | Germany | Mar. 27, 1924 |
| 635,806 | Great Britain | Apr. 19, 1950 |